(12) United States Patent
Sathyanarayana et al.

(10) Patent No.: US 8,901,441 B2
(45) Date of Patent: Dec. 2, 2014

(54) CONDUIT CONNECTOR AND METHODS FOR MAKING AND USING THE SAME

(75) Inventors: Ashok Alilughatta Sathyanarayana, Kothrud (IN); Chanddrakanthra Gireeshrao, Cary, NC (US); Robert Kenneth Sheehan, Cincinnati, OH (US)

(73) Assignee: Sigma Electric Manufacturing Corporation, Garner, NC (US)

( * ) Notice: Subject to any disclaimer, the term of this patent is extended or adjusted under 35 U.S.C. 154(b) by 1205 days.

(21) Appl. No.: 12/574,461

(22) Filed: Oct. 6, 2009

(65) Prior Publication Data

US 2010/0084854 A1    Apr. 8, 2010

Related U.S. Application Data

(60) Provisional application No. 61/195,491, filed on Oct. 8, 2008, provisional application No. 61/155,016, filed on Feb. 24, 2009.

(51) Int. Cl.
*H02G 3/10* (2006.01)
*H02G 3/06* (2006.01)

(52) U.S. Cl.
CPC .................................. *H02G 3/0691* (2013.01)
USPC .................. 174/660; 174/655; 285/154.1

(58) Field of Classification Search
USPC .............. 285/149.1–154.4, 46, 319; 174/650, 174/653–655, 659–661
See application file for complete search history.

(56) References Cited

U.S. PATENT DOCUMENTS

| | | | |
|---|---|---|---|
| 1,659,094 A | 2/1928 | Godfrey | |
| 2,365,785 A | 12/1944 | Tinnerman | |
| 2,973,212 A * | 2/1961 | Rose | 285/154.4 |
| 4,641,863 A | 2/1987 | Shemtov | |
| 4,880,387 A | 11/1989 | Stikeleather et al. | |
| 4,885,429 A | 12/1989 | Schnittker | |
| 4,919,370 A | 4/1990 | Martin et al. | |
| 4,990,721 A | 2/1991 | Sheehan | |
| 5,118,057 A | 6/1992 | Martin et al. | |
| 5,132,493 A | 7/1992 | Sheehan | |
| 5,171,164 A | 12/1992 | O'Neil et al. | |
| 5,204,499 A | 4/1993 | Favalora | |
| 5,285,013 A | 2/1994 | Schnell et al. | |
| 5,374,017 A | 12/1994 | Martin et al. | |
| 5,731,543 A | 3/1998 | Jorgensen | |
| 6,020,557 A | 2/2000 | Jorgensen | |
| 6,034,326 A | 3/2000 | Jorgensen | |
| 6,080,933 A | 6/2000 | Gretz | |
| 6,100,470 A | 8/2000 | Gretz | |
| 6,133,529 A | 10/2000 | Gretz | |
| 6,335,488 B1 | 1/2002 | Gretz | |
| 6,352,439 B1 | 3/2002 | Stark et al. | |
| 6,604,400 B1 | 8/2003 | Gretz | |
| 6,709,280 B1 | 3/2004 | Gretz | |
| 6,737,584 B2 | 5/2004 | Kiely | |
| 6,827,604 B1 | 12/2004 | White | |
| 6,872,886 B2 | 3/2005 | Kiely | |

(Continued)

*Primary Examiner* — Gregory Binda
(74) *Attorney, Agent, or Firm* — Cantor Colburn LLP (57) ABSTRACT

A connector can include: a body and a clip. The body can have a hollow core formed by walls and capable of receiving a conduit, and a side tab extending from the wall. The clip can have a transverse portion with an engagement configured to engage the side tab; and a member extending from the transverse portion to the first end and having a protrusion with an engagement surface and an entry surface. The protrusion can be configured to deflect radially inward.

12 Claims, 6 Drawing Sheets

(56) References Cited

U.S. PATENT DOCUMENTS

| | | |
|---|---|---|
| 6,916,988 B1 | 7/2005 | Auray et al. |
| 7,078,623 B1 | 7/2006 | Sheehan |
| 7,126,064 B1 | 10/2006 | Shemtov |
| 7,154,042 B2 | 12/2006 | Auray et al. |
| 7,154,054 B1 | 12/2006 | Gretz et al. |
| 7,220,923 B1 | 5/2007 | Sheehan et al. |
| 7,329,144 B1 | 2/2008 | Gretz et al. |
| 7,358,448 B2 | 4/2008 | Auray et al. |
| 7,390,979 B1 | 6/2008 | Johnson |
| 7,461,870 B2 | 12/2008 | Blake |
| 7,488,905 B2 | 2/2009 | Kiely et al. |
| 7,495,184 B1 | 2/2009 | Gretz |
| 7,576,290 B1 * | 8/2009 | Korcz .......................... 174/655 |
| 2009/0218131 A1 | 9/2009 | Sheehan et al. |

* cited by examiner

CONDUIT CONNECTOR AND METHODS FOR MAKING AND USING THE SAME

CROSS-REFERENCE TO RELATED APPLICATION

This Application is a continuation-in-part application of U.S. Provisional Patent Ser. No. 61/195,491, filed Oct. 8, 2008 and U.S. Provisional Patent Ser. No. 61/155,016, filed Feb. 24, 2009, both of which are incorporated herein by reference in their entirety.

TECHNICAL FIELD

The instant application relates to adapters for connecting conduits to enclosures, e.g., connecting an electrical conduit to a junction box, outlet box, or other enclosure.

BACKGROUND

The most common use for electrical conduit connectors is to facilitate the connection of a conduit or cable to a junction box. The junction box can be a variety of electrical enclosures such as an outlet box, transformer enclosure, circuit panel, lighting fixture—the list is nearly endless. Similarly, the conduit can be rigid or flexible, or could be hose, other tubing capable of routing electrical wire, or cable. Cable can be non-metallic sheathed cable, portable cord, or a variety of other types of electrical conductors. The instant application is equally successful in connecting a plurality of types of conduits, cables, and other electrical conductors to a wide variety of boxes and other enclosures. Therefore, as used in this specification, unless specifically stated otherwise, the term conduit is not limited to standard rigid electrical conduit, but shall be intended to mean any type of: conduit, cable, cord, or any other type of electrical conductor. Many commercial and residential buildings have electrical installations with many types of conduit-to-junction-box connections that utilize electrical connectors.

The two most common types of electrical connectors used are a snap-in connector, and a multipart connector which can be composed of two or more components that utilizes a threaded male end in conjunction with a threaded female locknut, hereinafter referred to collectively as a two-part locknut connector. In the case of the two-part locknut connector, the male threaded end is inserted into the junction box through a knockout (e.g., a hole or other opening). A rigid connection is established by threading the locknut onto the male end in the junction box interior. The snap-in connector is another commonly used connector, which utilizes a snap ring to quickly connect it to the junction box. Either type of connector is integrated with an adapter end, which allows the attachment of conduit, cable, or a variety of types of hollow tubing.

The installation of electrical systems is generally expensive as an electrician must first install the enclosures, route conduit between each enclosure, install connectors and then pull all necessary electrical wiring through the conduit. In other words, installation is expensive because it is labor intensive. The commercially available electrical connectors are one factor accentuating the labor intensiveness. Locknut connectors increase the cost of installing electrical systems for a number of reasons. The current art for two-part locknut connectors are plagued with labor intensive problems. First, the locknut connectors are shipped from the manufacturer preassembled. That is, the electrician must first remove the locknut from the male end before it can be installed. Once the male end of the connector is placed through the knockout, the electrician must rethread the locknut onto the connector from the interior of the junction box.

Two hands are required to disassemble and then reassemble the connectors in the knockout. Consequently, it is difficult to hold a tool or a piece of conduit while reassembling the connector. Once the locknut is threaded it must be tightened. In accordance with many building codes and safety regulations, connectors must be firmly and reliably attached to junction boxes. To properly tighten the two-part locknut connector, the electrician must use a tool, usually a set of pliers or a screwdriver. Occasionally, when the proper tool is unavailable, an electrician will use any object within reach. These situations, while rare, raise serious safety issues. In many instances, however, to "get the job done" the locknut is "finger" tightened. Those persons skilled in the art know that finger tightened two-part locknut connectors can eventually loosen, and a loose connector can cause great strain to be put onto the electrical wires and their connections resulting in an increase in the probability of an electrical fire or other electrical problems, such as poor grounding.

Secondly, when the electrician disassembles the fitting by taking the locknut off the connector, the locknut can be dropped or misplaced. This can occur when the electrician is in an elevated position, such as, on a scissor lift or on scaffolding because the electrical conduit is often installed in out-of-the-way places like in rafters and above ceilings. If the locknut cannot be found, the connector is useless. If the electrician decides to retrieve the dropped locknut, the installation time is prolonged.

A third common problem with the present locknut connectors is the locknut is easily cross threaded onto the male thread. When this occurs, the electrician must usually use a tool to remove the locknut. On occasion, cross threading the locknut will damage the male threads on the connector making it difficult or impossible to reuse the connector. Again, the electrician must spend their time either removing the defective connector or forcing the locknut through the damaged portion of the threads.

A fourth problem with the present two-part locknut connectors is the distance the male end protrudes into the junction box. In some installations, the space inside the enclosure is already minimal. The space limitation becomes an acute problem when an additional connector is installed. The male threaded end protrudes well past the depth of the locknut and may interfere with another connector, the contents of the enclosure, or wiring inside the box. Therefore, in a limited space enclosure, the excess thread must be removed. Typically, the electrician may clip off some of the receptacle or mounting screws, or completes a combination of space enlarging modifications, all of which prolong installation time and threaten the integrity of the system as designed. A fifth common problem with the present two-part locknut connectors occurs during disassembly of the connector from the enclosure. Electricians may disassemble an installation for a variety of reasons. The disassembly of the locknut connector is more time consuming than the installation. If the locknut was installed properly, that is, by tightening it with a tool, then the locknut must be removed with a tool. Similar to the installation, if the threads are damaged during disassembly, the connector is useless. Also similar to the installation problems, if the locknut is lost, it must be replaced if the connector is to be used again. The snap-in connector presents similar problems. However, the most significant problem is that these connectors, in most cases, do not create a rigid connection. Because the snap ring is sized to accept a variety of box wall thickness, it does not rigidly attach to many boxes. The loose fit may cause electrical continuity problems, a highly dangerous situation, since the box, the conduit, and the connector are intended to be part of the electrical grounding system in some applications.

There remains an unfulfilled need to provide a generally universal connector that is easy to use; e.g., which can be installed quickly and easily without tools, does not require access to the interior of the junction box, and/or can be easily removed and reused in the box.

BRIEF SUMMARY

Disclosed herein are conduit connectors and methods for making and using the same.

In some embodiments, a connector can comprise: a body comprising a hollow core formed by walls and capable of receiving a conduit, and a side tab extending from the wall; a clip having a first end and a second end and comprising a transverse portion with an engagement extending from a side thereof, wherein the engagement is configured to engage the side tab; a member extending from the transverse portion to the first end and having a protrusion with an engagement surface and an entry surface, wherein the engagement surface is located between the entry surface and the transverse portion, wherein the protrusion is configured to deflect radially inward as the connector is inserted into an enclosure and, once inserted, to move radially outward.

In some embodiments, a connector can comprise: a body comprising a first end and a second end with walls therebetween forming a hollow core capable of receiving a conduit disposed therebetween, a side tab extending from the wall, and a box engagement region for attaching the connector to an enclosure; and a clip having a first end and a second end and comprising a front attachment comprising a top end, a flexible mid-portion configured to deflect under pressure, and a bottom end, a transverse portion with an engagement extending therefrom and configured to engage the side tab, wherein the transverse portion extends from the front attachment near the top end thereof, and an arm that extends from the transverse portion away from the front attachment, wherein the arm is configured to engage a conduit located in the core.

In some embodiments, a connector can comprise: a body, a spring clip, and a cable clip. The body can comprise a first end and a second end with walls therebetween forming a hollow core capable of receiving a conduit disposed therebetween, a side tab extending from the wall, and a box engagement region for attaching the connector to an enclosure. The spring clip can comprise a top end, a flexible mid-portion configured to deflect under pressure, and a bottom end. The cable clip can comprise a bridge portion with an engagement extending from a side thereof and configured to engage the side tab, and an arm that extends from the bridge portion, wherein the arm is configured to engage the conduit when disposed in the core.

The above described and other features are exemplified by the following figures and detailed description.

BRIEF DESCRIPTION OF THE DRAWINGS

Refer now to the figures, which are merely exemplary, not limiting, and wherein like elements are numbered alike.

DETAILED DESCRIPTION

Figure 14:
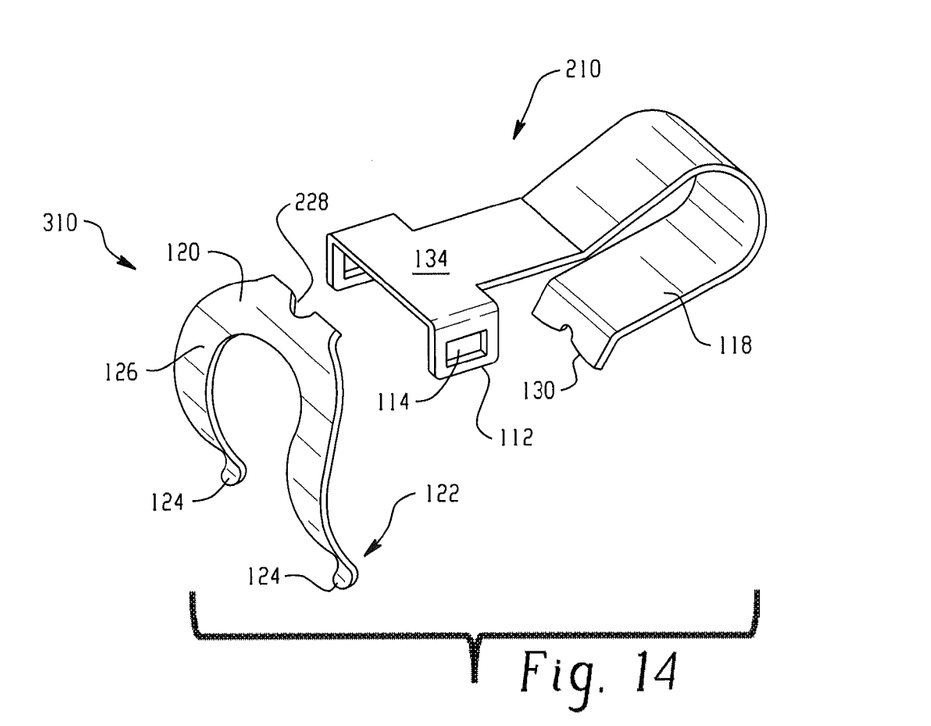
FIG. 14 is a prospective view of the embodiment of a clip comprising a spring clip and a cable clip, for use with an embodiment of the conduit connector, not to scale.

Disclosed herein are adapters (also known as conduit connectors and fittings) capable of connecting a conduit (e.g., electrical cable) to an enclosure, e.g., capable of connecting an electrical conduit to a junction box. The conduit connector comprises a body and clip(s), wherein the clip can be a single, unitary element (e.g., such as illustrated in FIGS. 1, 2, 9, and 10), or multiple components (such as illustrated in FIG. 14). The clip can engage the enclosure, the body, and/or the conduit (e.g., cable). In some embodiments, the clip extends into the enclosure to snap fit the connector to the enclosure, and extends into connector cavity to engage the cable, thereby retaining it within the connector. In this embodiment, the clip is connected to the body before the body is inserted into the enclosure. In some embodiments, the clip extends from near the first end of the connector where it engages an outside of the enclosure and the connector body so as to compress tabs of the body against an interior of the enclosure, into the cavity where it again engages the cable to retain the cable within the cavity. In this embodiment, the clip can be attached to the body before or after the body is attached to the enclosure. In either embodiment, the cable can be inserted into the cavity before or after attachment of the body to the enclosure and/or before or after attachment of the clip to the body. In some more embodiments, the clip can comprise a spring clip and cable clip(s). One or more cable clips can be attached to the connector body and extend into the core of the body to engage the cable. Meanwhile, a spring clip can engage an outside of the enclosure and the connector body so as to compress tabs of the body against an interior of the enclosure. In this embodiment, the spring clip and/or the cable clip can be attached to the body before or after the body is attached to the enclosure. In any of these methods, the cable can be inserted into the cavity before or after attachment of the body to the enclosure and/or before or after attachment of the cable clip to the body, and/or before or after attachment of the spring clip to the body.

Referring to FIGS. 1-7, the conduit connector can comprise a body 40 with opening(s) (e.g., channel, cavity, space)

42 defined by walls 44. Extending from a side of the wall 44, opposite the opening, can be side tab(s) 46 (e.g., protrusions). The side tab 46 is configured to engage the clip 10 through retainer hole(s) (e.g., opening(s)) 14 in engagement 12. Desirably, the clip 10 comprises two or more engagements 12 for securely attaching the clip 10 to the body 40. Hence, the body 40 comprises complementary side tabs 46 to engage the retainer hole(s) 14 accordingly.

In the embodiment illustrated in FIGS. 1-7, the clip has engagements 12 extending from the transverse portion 16 of the clip 10 at an angle θ (e.g., an angle θ of less than 145°, specifically, about 75° to about 125°). The transverse portion 16 has a sufficient size to extend across the opening 42 between the walls 44 such that the engagements 12 can extend down a side of the wall 44 opposite the opening 42 and engage the side tab(s) 46, thereby connecting the clip to the body 40.

Similarly, in the embodiments illustrated in FIGS. 8-11, the conduit connector comprises a body 140 with optional opening(s) 42 defined by walls 144. Extending from a side of the wall 44, opposite the opening, is a side tab(s) 46. The side tab 46 is configured to engage the clip 110 through the retainer hole (e.g., opening) 114 in engagement 112. Desirably, the clip 110 comprises two or more engagements 112 for securely attaching the clip 110 to the body 140. Hence, the body 140 comprises complementary side tab(s) 46 to engage the retainer hole(s) 114 accordingly. The clip can have engagement(s) 112 extending from the transverse portion 116 of the clip 110 at an angle that enables snap engagement of the engagement(s) 112 with the side tabs 46.

In the various embodiments of the connector (including those illustrated in the figures), at least two engagements (e.g., two or more) 12,112 are employed for secure attachment of the clip to the body. Additionally, the side tab(s) and the retainer hole(s) can be designed (e.g., size and geometry) to simplify attachment of the engagement to the body. For example, the side tab can be angled away from the body and away from the body opening so that the engagement readily slides over, deflecting outward, and then snaps onto the side tab as the peak of the side tab aligns with the retainer hole. Some exemplary side tab geometries include triangular (e.g., right triangle with the right angle located away from the transverse portion; isosceles triangle, and so forth), polygonal (e.g., with a convex upper surface (i.e., the surface closest to the transverse portion), with the ends of the polygon converging in a direction away from the body (e.g., with the lower surface extending perpendicularly from the body and the upper surface converging from the body toward the lower surface), and so forth). Furthermore, the retainer hole can optionally be oversized as compared to the side tab (e.g., the retainer hole can have a size of greater than or equal to 110% the side tab size, specifically, greater than or equal to 120% of the side tab size), to enable facile insertion of the side tab into the retainer hole.

In use, a conduit 80 (e.g., an electrical conduit, electrical cable, or the like) is inserted through the body 40, 140 until the conduit is accessible at a first end 48,148 of the body 40,140 that will be inserted into an enclosure 90. In the embodiment illustrated in FIGS. 3-7, before or after the conduit 80 is disposed within the body 40, clip(s) 10 can be attached to the body 40; e.g., one clip 10 can be attached to one side of the body 40 and a second clip 10 can be attached to an opposite side of the body 40. The clip(s) 10 are attached such that engagement(s) 12 extend across the wall 44 from an initial portion 50 toward a base 52 that terminates at the core 54 of the body 40. When the clip 10 is connected to the body 40 and the side tab(s) 46 pass through the retainer hole(s) 14, and the extension 18 extends from a second end 20 of the clip 10 into the core 54 and, if the cable is in the body, engages the outer surface of the conduit 80.

The extension 18 comprises a geometry capable of gripping and retaining the conduit 80 in the body 40, and of inhibiting longitudinal and lateral movement of the conduit 80 within the body 40. For example, as illustrated, the extension 18 can extend into valleys 82 formed by ridges 84, thereby holding the conduit 80 in the desired location of the body 40. Desirably, the extension 18 is flexible, enabling it to secure various sizes of conduits. Optionally, various clips can be formed with different size extensions 18. These clips could be used with a single body, allowing various size conduits to be securely retained within the body. Additionally, depending upon the flexibility of the extension 18, a variety of cable sizes can be used with the same extension 18.

With the clip 10 attached to the body 40, the connector can be inserted into an opening 92 in the enclosure 90 (only a portion of 90 is illustrated in the figures for clarity reasons). Insertion of the connector into the opening can be accomplished by placing the first end 48 of the body 40 adjacent the opening 92 and pushing the body 40 therethrough. Due to the angled entry surface 28 of the protrusion 24, as the clip(s) 10 are forced through the opening 92, the edge of the opening 92 exerts radial force on the clips 10, forcing the clips together and toward the center of the body 40, and allowing the first end 48 of the body 40 to extend into the enclosure 90. Once the edge of the opening 92 passes the peak 32 of the protrusion 24, the end of the clip springs back toward its original configuration; snap attaches to the enclosure. The engagement surface 26 of the protrusion 24 engages the inner surface 94 of the enclosure 90, thereby inhibiting the accidental removal or withdrawal of the connector and the conduit from the enclosure 90. Desirably, the engagement surface 26 is configured to securely engage the inner surface 94. Hence, the engagement surface 26 has a sufficient length from the member 22 to the peak 32 to securely engage the enclosure 90.

Optionally, the clip 10 can also comprise a ledge 30 that enables facile removal of the connector from the enclosure without tools or special equipment. Removal of the connector from the enclosure can be accomplished by applying radial pressure to the ledges 30 of the clips 10 such that the clips bend toward one another, e.g., toward the center of the body 40, a sufficient distance such that the distance between peak 32 of one clip 10 and peak 32 of another clip is less than the diameter of the opening 92. The protrusions 24 can then be pushed back out of the opening (or the connector can be pulled from outside of the opening 92), to remove the connector from the enclosure.

In the embodiment set forth in FIGS. 8-13, the spring clip 110 can be attached to the body 140 before or after the connector has been connected to an enclosure 90 (e.g., to a junction box or the like). The front attachment 132 of the spring clip (e.g., a leaf spring) 110 is configured to engage the conduit 80 and the enclosure 90, e.g., the secondary edge 166 of the connector body 140 and the outer surface 96 of the enclosure 90, to compress the leading and following tabs against an inner surface of the enclosure. The spring comprises a geometry enabling it to mate with the body 140 (while the leading and following tabs 156, 162 engage an interior wall of an enclosure). The geometry can be generally "U" shaped or horseshoe shaped, with a curved (e.g., convex/concave) mid-portion 126 such that the spring curves outward from both the top end 120 and the bottom end 122 toward the mid-portion 126; it is bowed (e.g., arched).

The mid-portion 126 as well as the top end 120, bottom end 122, optional angled lip(s) 124, and optional notch 128, form the front attachment 132. The notch 128, which can be located at the top end 120, can be configured to engage with a projection 164 on the body 140 at the secondary edge 166, e.g., to facilitate proper alignment of the spring clip, facilitate installation of the spring clip, and/or to enhance retention of the spring clip on the body 140, as desired. The spring 110 can further comprise angled lip(s) 124 located at the bottom end 122 configured to contact and curve away from the secondary edge 166.

From the top end 120 of the clip 110 to the extension 118, is a transverse portion 116 that comprises engagement(s) 112 configured to secure the spring clip 110 to the body 140 via the engagement (e.g., snap engagement) of the retainer hole 114 with the side tab 46. Desirably, the transverse portion 116 has a sufficient size to extend across the opening 42 between the walls 44 such that the engagements 112 can extend down a side of the wall 44 opposite the opening 42 (which can be an opening or a solid area) and engage the side tab(s) 46, thereby connecting the spring clip 110 to the body 140.

Desirably, the clip 110 comprises two or more engagements 112 for securely attaching the clip 110 to the body 140. Hence, the body 140 comprises complementary side tabs 46 to engage the retainer holes 114, accordingly. As is shown in FIG. 10 (and in the spring clip blank of FIG. 9), the spring clip 140 can have engagements 112 extending from the transverse portion 116 of the clip 110 at an angle θ as described in relation to clip 10.

Figure 1:
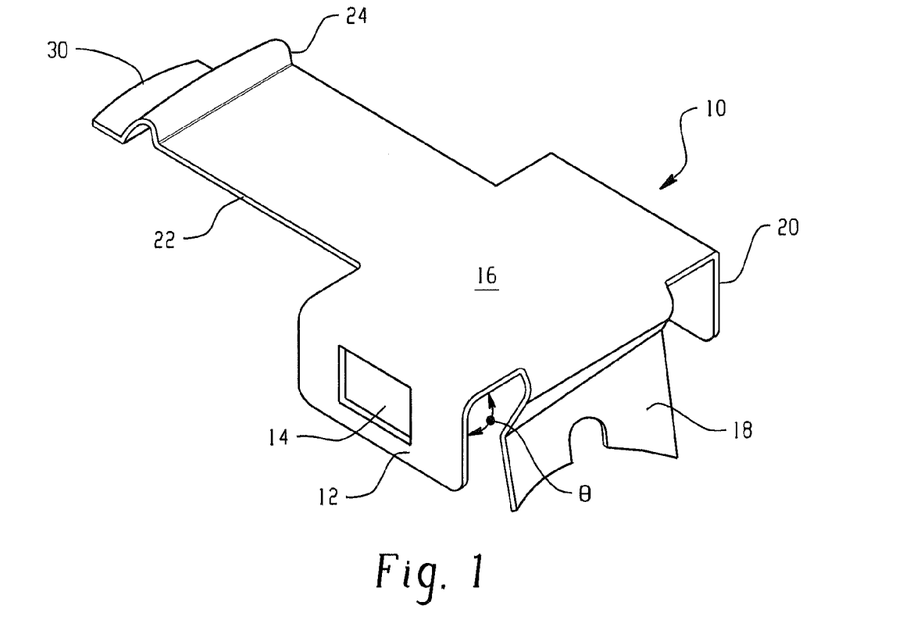
FIG. 1 is a prospective view of an embodiment of a clip for use in an embodiment of the conduit connector, not to scale.
Figure 2:
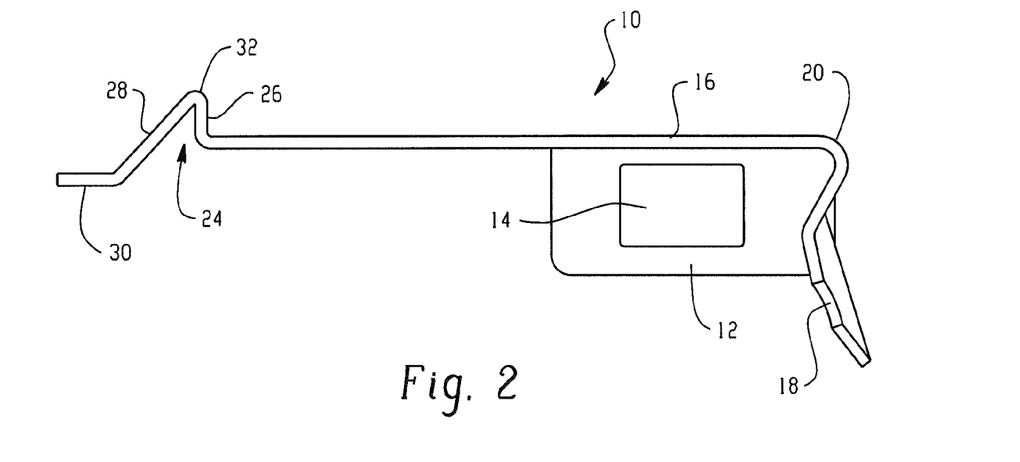
FIG. 2 is a side view of the clip from FIG. 1.
Figure 3:
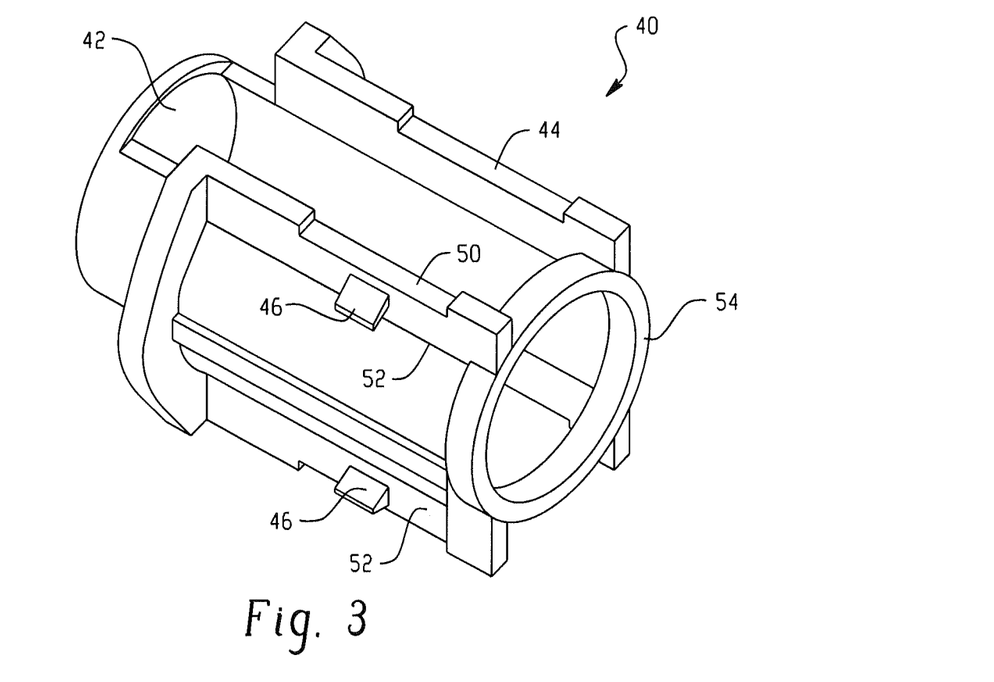
FIG. 3 is a prospective view of an embodiment of the connector body.
Figure 4:
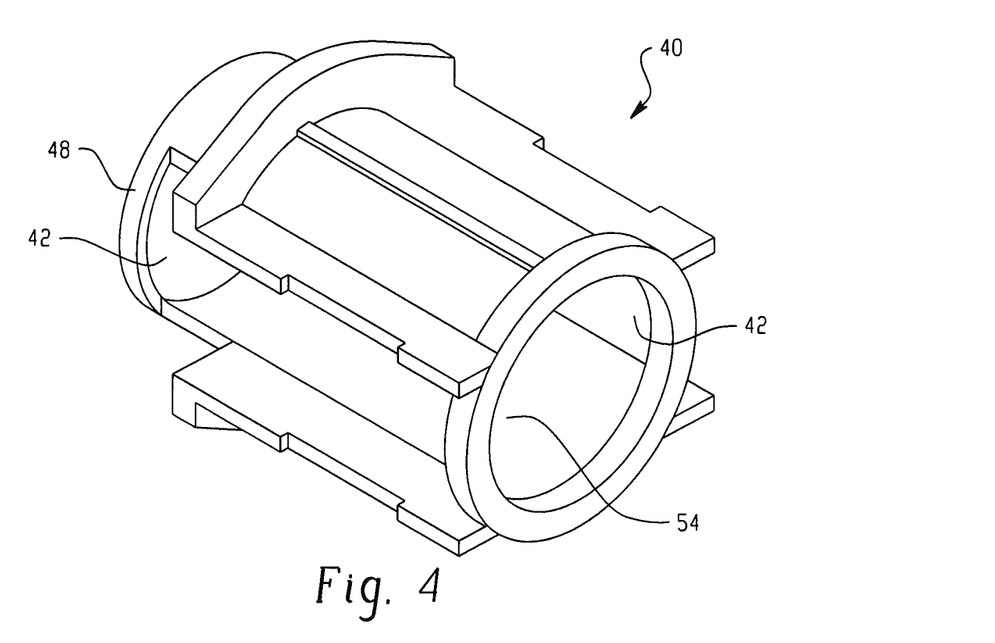
FIG. 4 is another prospective view of the connector body of FIG. 3.
Figure 5:
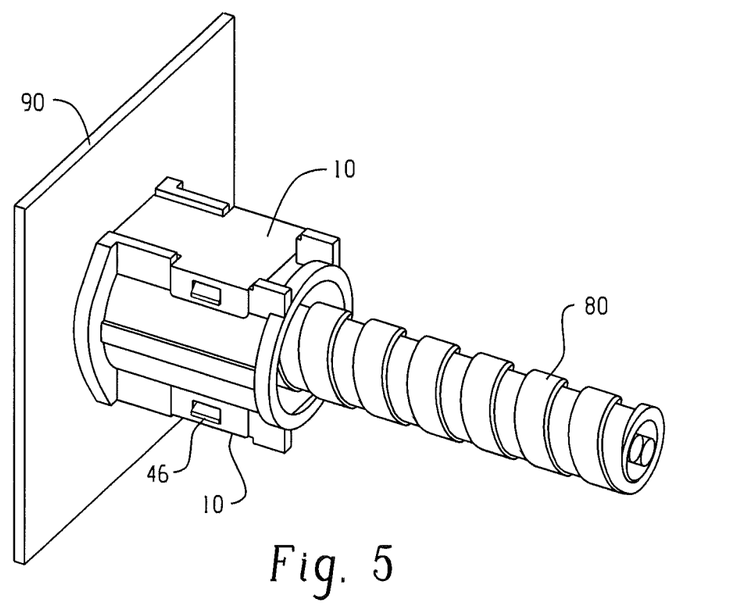
FIG. 5 is a prospective view of an embodiment of a conduit connector connected through an opening, with a conduit disposed through the connector body.
Figure 6:
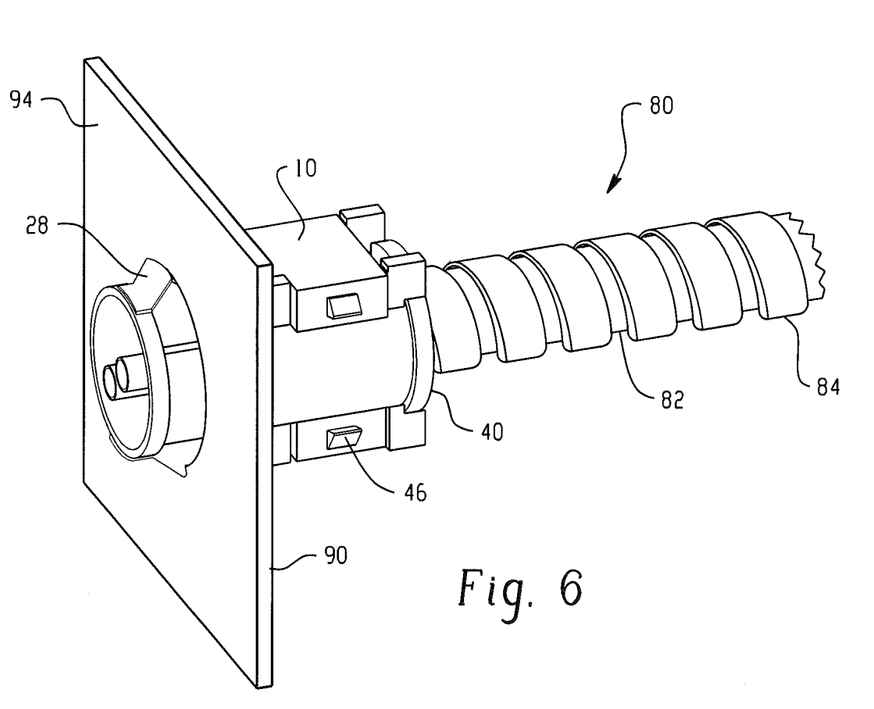
FIG. 6 is another prospective view of the embodiment illustrated in FIG. 5.
Figure 7:
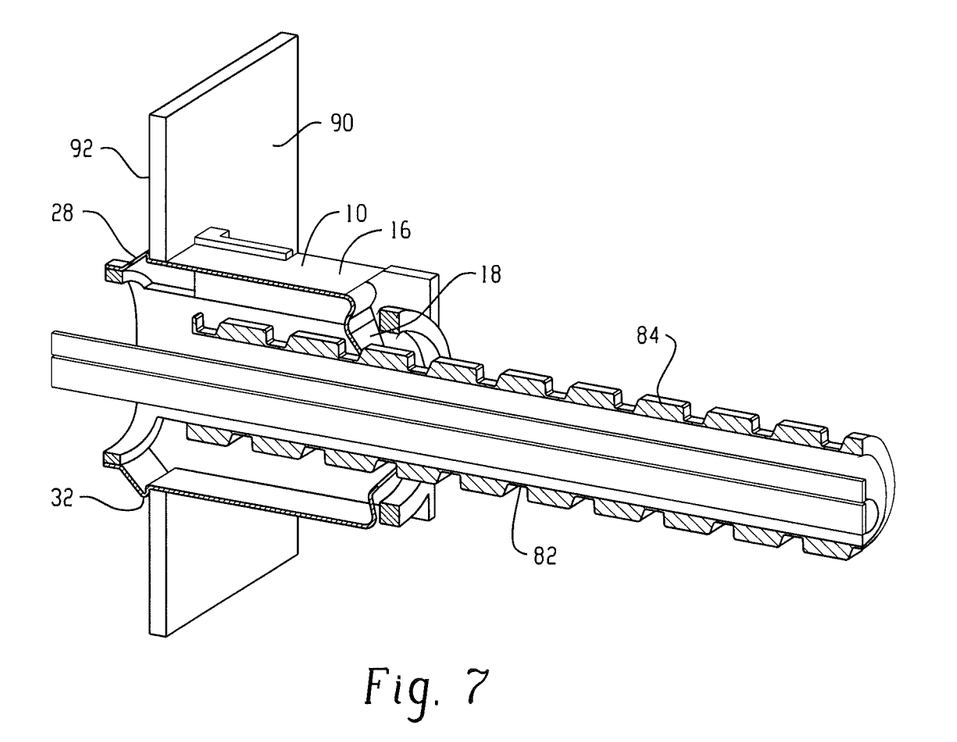
FIG. 7 is a cross-sectional view of the conduit connector, partial wall, and conduit of FIG. 6.
Figure 8:
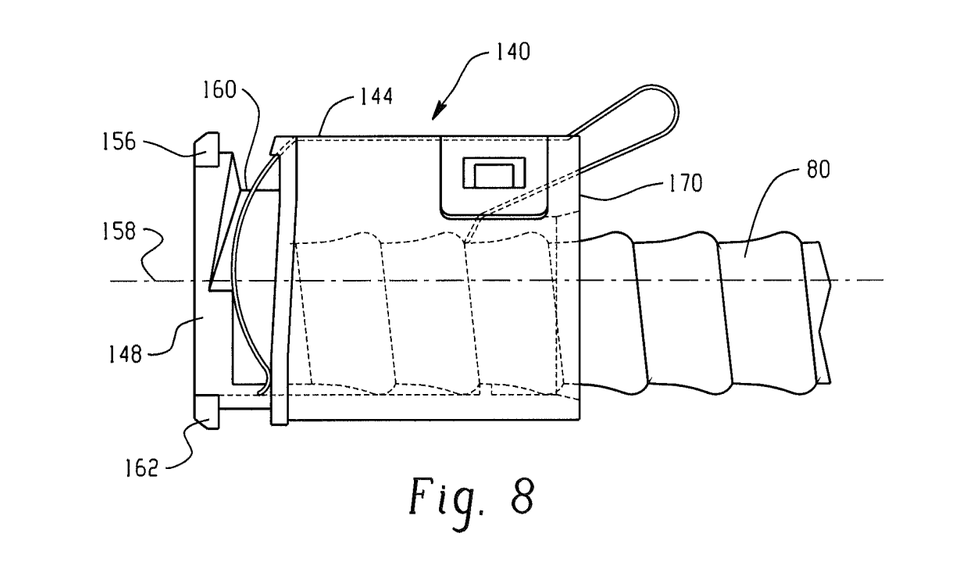
FIG. 8 is a side view of another embodiment of a conduit connector, not to scale.
Figure 9:
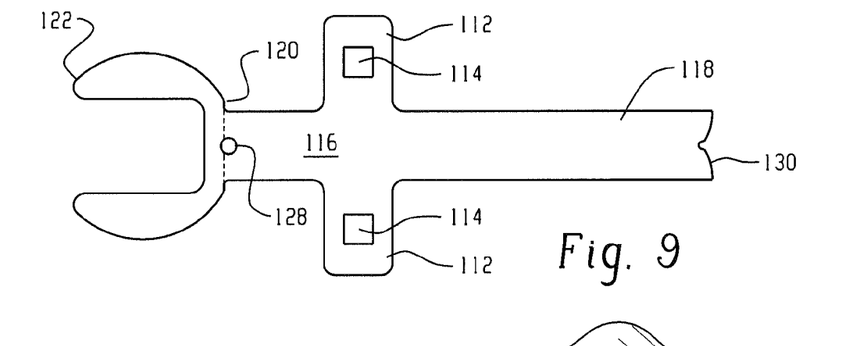
FIG. 9 is a top view of an embodiment of a spring clip blank for use with the conduit connector of FIG. 8, not to scale.
Figure 10:
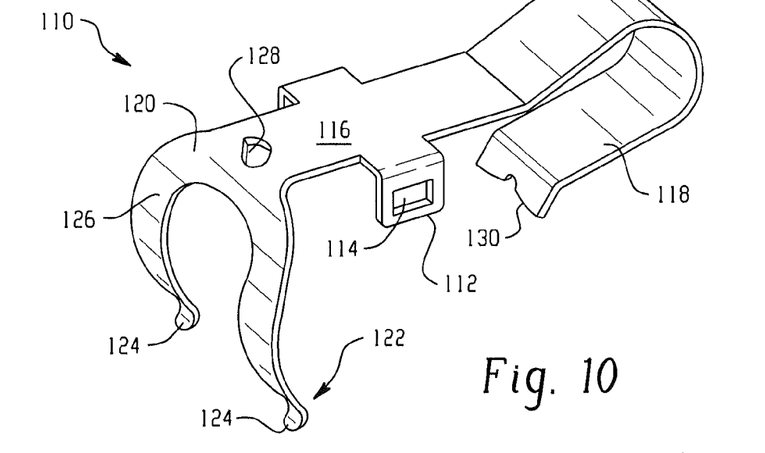
FIG. 10 is a prospective view of the embodiment of the spring clip formed from the spring clip blank of FIG. 9, not to scale.
Figures 11, 12:
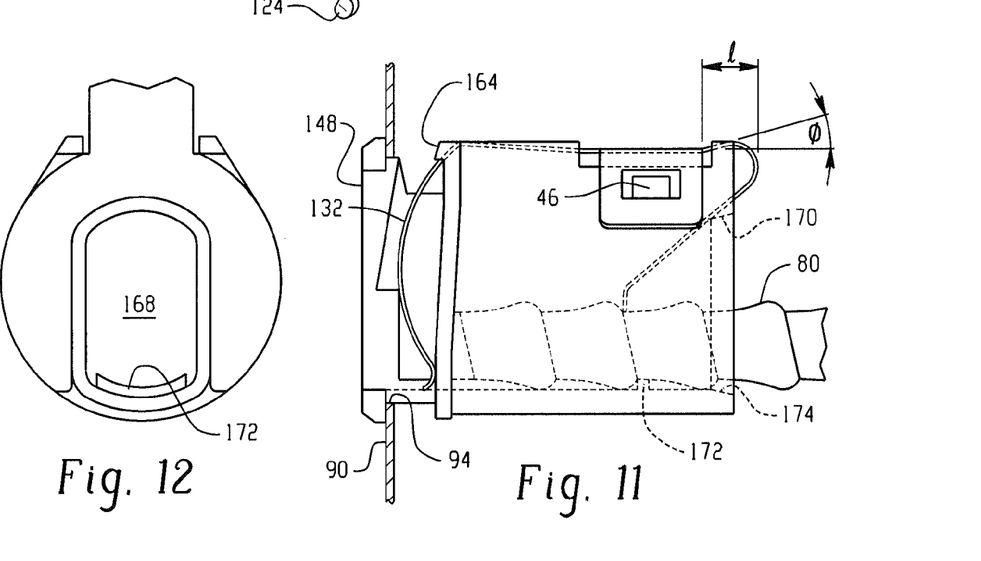
FIG. 11 is a cut-away side view of another embodiment of a conduit connector comprising a retention protrusion, not to scale.
FIG. 12 is an end view of the conduit connector of FIG. 11 illustrating an embodiment of the retention protrusion, not to scale.

As is illustrated, the Figure ("FIG.") 10, the extension 118 terminates in a wings 130 configured to engage and retain a conduit within the body 140 of the connector. The extension (or arm) 118 extends from the transverse portion 116 into the core (e.g., cavity) 54, extending from near the second end 170 of the body 140 toward the first end 148 of the body 140, within the core 54. The wings 130 can be angled or canted to correspond to the angle of the helical groove in the conduit to be held within the connector body 140. For example, the wings can form a generally scalloped or "V" shape that conforms generally to the curvature of the conduit to provide enhanced engaging contact and electrical grounding. The shape of the wing(s) 130 can enable contact of greater than or equal to 60 percent of the end of the wings with the surface of the cable, specifically, greater than or equal to 80 percent, and more specifically, greater than or equal to 90 percent.

The arm 118 is resilient and flexible so as to deflect (when pressed against a conduit 80 during insertion of the clip 110 into the core 54), to engage the surface of the conduit 80 with the wings 130, and to create a compressive force against the conduit 80, thereby inhibiting facile removal of the conduit from the core 54. The retention capabilities of the arm can be adjusted via the choice of clip materials, the thickness of the arm, length "l" of the curvature section, and/or the angle Φ of the arm 18,118. (See FIG. 11) In some embodiments of the arm 18,118, the angle Φ is up to 15 degrees, specifically, 10 degrees to 15 degrees, and more specifically, 8 degrees to 15 degrees (e.g., 10 degrees to 12 degrees). In some embodiments, the thickness of the clip can be greater than or equal to 0.30 millimeters (mm), specifically, greater than or equal to 0.40 mm, and more specifically, greater than or equal to 0.5 mm. The length "l" from the engagement 12,112 to the end the curved section is dependent on the size of the connector. In some embodiments, the length, "l", can be less than or equal to 10 mm, specifically, less than or equal to 8.0 mm, and more specifically, less than or equal to 6.0 mm.

Yet another embodiment of the clip is illustrated in FIG. 14. In this embodiment, the clip comprises a separate spring clip 310 and cable clip 210. The spring clip 310 can be similar to the front attachment 132 of clip 110. For example, the spring clip 310 can comprise a mid-portion 126 as well as the top end 120, bottom end 122, optional angled lip(s) 124, and optional notch 228 for engaging the optional projection 164. Similarly, the cable clip 210 can comprise the arm 118 and optionally wings 130. Between the engagements 112, the cable clip 210 can comprise a bridge portion 134, connecting the engagements 112 and the extension arm 118. As with transverse portion 116, the bridge portion 134 has a size and geometry to span the body between the walls 44, enabling the engagements 112 to connect to side tabs 46. In this embodiment, as well as the other embodiments, the body may comprise an opening 42 (see FIG. 3), a partial opening (e.g., only in the area to be spanned by the bridge portion 134), or no opening. As with the clip 10, multiple cable clips 210 can be employed, engaging appropriate side tabs 46 on the body.

Further restriction of the removal of the conduit 80 from the core 54 can be attained with an optional protrusion (e.g., rib, dimple, ridge, raised portion) 172 that can extend across the wall, e.g., orthogonal to the central axis and along the wall of the core 54, or across the wall in a direction complementary to the angle of the helical groove of the cable (e.g., so as to sit within the groove of the cable when the cable is inserted into the cavity and pressed into the wall by the arm 118). (See FIG. 12) The protrusion 172 can be flexible, e.g., to enable easy insertion of the conduit into the core, or can be rigid (e.g., inflexible) to enhance the retention capability of the protrusion 172.

During use of the connector, the conduit can be inserted into the core 54 before or after the connector is attached to the enclosure 90. For example, referring to FIG. 11, the snap clip 110 can be attached to the body by passing the arm 118 into the core 54 and passing the front attachment 132 over the root surface 160; e.g., passing the bottom end 122 over the root surface 160 along the secondary edge 166. The snap clip 110 is then snapped onto the body 140 such that the transverse portion 116 extends over the opening to the core 54, engagements 112 extend down the body 140 such that retainer holes 114 engage the side tabs 46, and the wings 130 engage the conduit (e.g., cable) 80 and force the conduit toward the protrusion(s) 172. The connector can then be inserted into the opening 92 in the enclosure 94. Optionally, the conduit can be inserted into the core 54 from the second end 170 toward the first end 148, before the snap connector has been attached to the body, after the snap connector has been attached to the body, either before or after the body has been attached to the enclosure.

Figure 13:
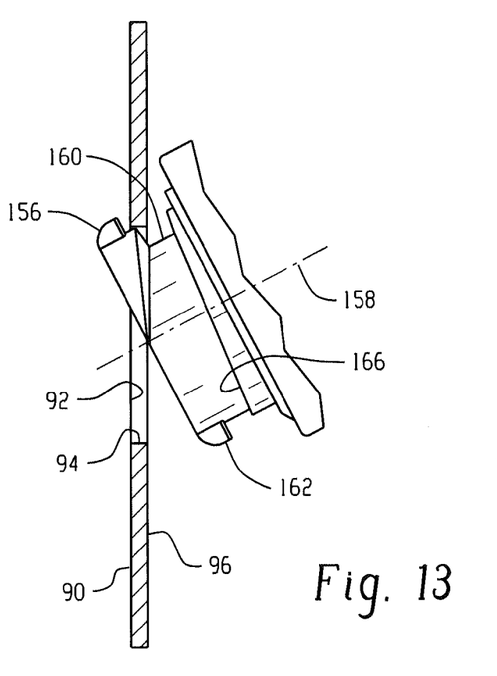
FIG. 13 is a cut away, elevation view of an embodiment of the conduit connector, not to scale, illustrating the insertion of the connector into an enclosure.

In another embodiment, the body is attached to the opening 92 in the enclosure 90 prior to the engagement of the spring clip 110. Attachment of the body to the enclosure can comprise inserting the leading tab 156 from the outside of the enclosure 90 through the opening 92 by angling the body 140 such that the central axis 158 is not orthogonal to the opening 92. Once the leading tab 156 is on the inside of the enclosure 90, the root surface 160 can be brought into contact with the edge 94, as shown in FIG. 13. The central axis 158 is then reoriented orthogonally to the opening 92 while holding the root surface 160 in contact with the edge 94. In an embodiment, the root surface central axis can be offset from the central axis 158 toward the follower tab 162 by a sufficient amount to accommodate a larger variation in standard opening diameters thereby providing for easier installation. During reorientation of the body 140, the follower tab 162 passes through the opening 92 into the enclosure 90. At this point, both the leading and follower tabs (156,162) are on the inside of the enclosure 90. Since the tab perimeter diameter is greater than the opening diameter, when the body 140 moves orthogonally away from the enclosure 90, the leading tab and follower tab primary contact surfaces engage the enclosure interior surface. The spring clip is attached to the body, compressing the enclosure 90 between the front attachment 132 and the leading and follower tab primary contact surfaces.

If the conduit was not previously inserted into the body 140, it can now be inserted into the body, before or after the attachment of the spring clip 110. For example, the conduit can be inserted into the second end 170 of the body 140. The arm 118 can be inserted into the core and the front portion of the spring clip 110 can be attached to the body 140 such that the mid-portion of the clip contacts the enclosure 90, the lips contact the secondary edge 166, and the notch 128 attaches to the projection 164, thereby drawing the leading and following tabs drawn tight to the enclosure 90 by attaching the front attachment 132 to the body 140.

If the conduit is inserted into the core 54 after the spring clip is attached to the body (either before or after the body is attached to the enclosure), the conduit is inserted into the core, from the second end 170, toward the first end 48,148. As the conduit passes into the core, it deflects the arm 18,118 toward the transverse portion 16,116, allowing the wings 130 to travel over the helical surface of the conduit 80 and to engage the conduit groove once the conduit is inserted.

The multicomponent clip of FIG. 14 can be used similar to the clip of FIGS. 8-13, whereby the spring clip 310 can be attached before or after the connection of the body to the enclosure and before or after the insertion of the cable into the core of the body. In one embodiment, a cable can be inserted into the connector body. A cable clip 210 can then be attached to the side of the body; optionally, two cable clips 210 can be attached to opposite sides of the body such that the cable is retained between two arms 118. The body can then be attached to the enclosure as described in relation to FIG. 13 such that the leading tab and following tab are inserted into the enclosure. The spring clip 310 can then be attached to the body, e.g., drawing the leading and following tabs firmly against the interior of the enclosure.

The conduit connector can be used in a variety of fashions including, connectors for metallic conduits, non metallic flexible conduits, armored cables, metal clad (MC) cables, non-metallic sheathed cables (commonly known as romex), flexible metal conduits, cord grip/strain relief/cable gland connectors, etc. This conduit connector succeeds in reducing cost by saving time and labor during both manufacturing and installation. The connector also occupies minimal space inside the connector, reducing or eliminating interference problems that may occur with standard locknut connectors (e.g., when the installer must shorten the device mounting screws). The conduit connector further increases safety, as no fingers or tools touch the inside of the connector, where hot, energized areas are located.

The embodiments of the connector can be formed of various materials such as metals, plastics, alloys, and so forth, such as zinc, titanium, steel, brass, malleable iron, aluminum, and so forth, as well as combinations comprising at least one of the foregoing materials. For example, the body can be formed of zinc with the clip comprising steel.

The conduit connector answers a long felt need for an electrical connector which can be installed quickly and easily without tools and does not require access to the interior of a junction box. The electrical connector has utility, among other uses, in connection of conduit to junction boxes. Additionally, although this connector securely engages the enclosure and is not easily dislodged due to bumping or otherwise, it can be easily removed if desired. The conduit engagement region can cooperate with a variety of conduit, cables, and other electrical conductors.

In some embodiments, a connector can comprise: a body comprising a hollow core formed by walls and capable of receiving a conduit, and a side tab extending from the wall; a clip having a first end and a second end and comprising a transverse portion with an engagement extending from a side thereof, wherein the engagement is configured to engage the side tab; a member extending from the transverse portion to the first end and having a protrusion with an engagement surface and an entry surface, wherein the engagement surface is located between the entry surface and the transverse portion, wherein the protrusion is configured to deflect radially inward as the connector is inserted into an enclosure and, once inserted, to move radially outward.

In some embodiments, a connector can comprise: a body comprising a first end and a second end with walls therebetween forming a hollow core capable of receiving a conduit disposed therebetween, a side tab extending from the wall, and a box engagement region for attaching the connector to an enclosure; and a clip having a first end and a second end and comprising a front attachment comprising a top end, a flexible mid-portion configured to deflect under pressure, and a bottom end, a transverse portion with an engagement extending therefrom and configured to engage the side tab, wherein the transverse portion extends from the front attachment near the top end thereof, and an arm that extends from the transverse portion away from the front attachment, wherein the arm is configured to engage a conduit located in the core.

In some embodiments, a connector can comprise: a body, spring clip(s), and cable clip(s). The body can comprise a first end and a second end with walls therebetween forming a hollow core capable of receiving a conduit disposed therebetween, a side tab extending from the wall, and a box engagement region for attaching the connector to an enclosure. The spring clip can be configured to deflect under pressure and configured to attach to the box engagement region. The cable clip can comprise a bridge portion with an engagement extending from a side thereof and configured to engage the side tab, and an arm that extends from the bridge portion, wherein the arm is configured to engage the conduit when disposed in the core.

In various of the embodiments: (i) the engagement can extend from the transverse portion at an angle θ of less than 145°, specifically, at an angle θ of 75° to 115°; (ii) the connector can further comprise a protrusion extending into the core from the wall and configured to contact a conduit when disposed in the core and retained with the arm; (iii) the clip can further comprise a ledge extending from the engagement surface away from the first end; (iv) the clip can further comprise an arm extending from the transverse portion and configured to engage the conduit disposed when located in the core; (v) the connector can further comprise a protrusion extending into the core from the wall and configured to contact a valley of a conduit; (vi) the opening can have a size that is greater than or equal to 10% larger than a side tab size; (vii) the connector can further comprise a protrusion extending into the core from the wall and configured to contact a valley of a conduit; (viii) the front attachment can further comprise a notch disposed near the top end and configured to engage a projection on the body, and angled lips located near the bottom end; (ix) the front attachment have a curved mid-portion and a generally "U" shaped geometry; (x) the arm can terminate in wing(s) configured to engage a conduit and having a geometry complementary to the conduit geometry (e.g., to enable electrical grounding); (xi) the body internal surface can diverge in the core at the second end, away from the first end (e.g., at the edge of the second end so as to enable facile insertion o the cable); and/or (xii) the engagement can comprise a retainer hole located and configured to engage the side tab.

The terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

The conduit connector of the instant application enables a significant advance in the state of the art. The detailed description set forth above in connection with the drawings is intended merely as a description of embodiments of the application, and is not intended to represent the only form in which the present application can be constructed or utilized. The description sets forth the designs, functions, means, and methods of implementing the application in connection with the illustrated embodiments. It is to be understood, however, that the same or equivalent functions and features can be accomplished by different embodiments that are also intended to be encompassed within the spirit and scope of the application.

What is claimed is:

1. A connector, comprising:
    a body comprising
        a hollow core formed by walls and capable of receiving a conduit, and
        a side tab extending from the wall; and
    a clip having a first end and a second end and comprising
        a transverse portion with an engagement extending from a side thereof, wherein the engagement comprises a hole configured to engage the side tab; and
        a member extending from the transverse portion to the first end and having a protrusion with an engagement surface and an entry surface, wherein the engagement surface is located between the entry surface and the transverse portion, wherein the protrusion is configured to deflect radially inward as the connector is inserted into an enclosure and, once inserted, to move radially outward.

2. The connector of claim 1, wherein the engagement extends from the transverse portion at an angle θ of less than 145°.

3. The connector of claim 2, wherein the angle θ is 75° to 115°.

4. The connector of claim 1, wherein the clip further comprises a ledge extending from the entry surface of the protrusion away from the transverse portion, wherein the ledge is configured to deflect the protrusion inwardly with respect to the body as a pressure is applied to the ledge, wherein the protrusion is where the entry surface and the engagement surface meets.

5. The connector of claim 1, wherein the clip further comprises an arm extending from the transverse portion and configured to engage the conduit disposed when located in the core.

6. The connector of claim 1, wherein the body further comprises a protrusion extending into the core from the wall and configured to contact a valley of the conduit.

7. The connector of claim 1, wherein the body further comprises a second side tab extending from the wall, and the clip further comprise a second engagement extending from a second side of the transverse portion of the clip, wherein the second engagement is configured to engage the second tab of the body.

8. The connector of claim 7, wherein the engagement of the clip is opposite to the second engagement of the clip.

9. A connector, comprising:
    a body comprising
        a hollow core formed by walls and capable of receiving a conduit, and
        a side tab extending from the wall; and
    a clip having a first end and a second end and comprising
        a transverse portion with an engagement extending from a side thereof, wherein the engagement is configured to engage the side tab; and
    a member extending from the transverse portion to the first end and having a protrusion with an engagement surface and an entry surface, wherein the engagement surface is located between the entry surface and the transverse portion, wherein the protrusion is configured to deflect radially inward as the connector is inserted into an enclosure and, once inserted, to move radially outward; wherein the connector further comprises a second clip having a first end and a second end and comprising
        a second transverse portion with a second engagement extending from a side thereof, wherein the second engagement is configured to engage a second side tab of the body; and
        a second member extending from the second transverse portion to the first end and having a second protrusion with a second engagement surface and a second entry surface, wherein the second engagement surface is located between the second entry surface and the second transverse portion, wherein the second protrusion is configured to deflect radially inward as the connector is inserted into an enclosure and, once inserted, to move radially outward.

10. The connector of claim 9, wherein the clip is attached to a first side of the body and the second clip is attached to an opposing second side of the body.

11. The connector of claim 9, wherein the clip comprises a ledge extending from the entry surface of the protrusion away from the transverse portion of the clip, and the second clip comprises a ledge extending from the second entry surface of the second protrusion away from the second transverse portion of the second clip.

12. The connector of claim 9, wherein the ledge and the second ledge are configured to bend the clip and the second clip toward one another when a pressure is applied to the ledge and the second ledge.

* * * * *